Jan. 16, 1951 H. D. HALLENBERG ET AL 2,538,363
DRYING APPARATUS
Filed April 1, 1946 2 Sheets-Sheet 2
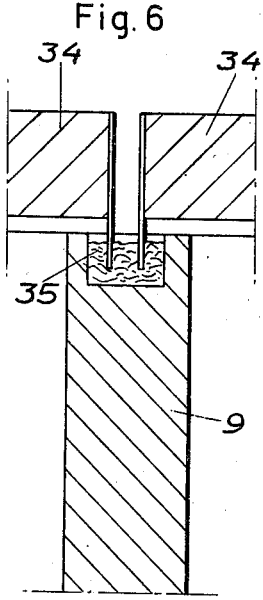
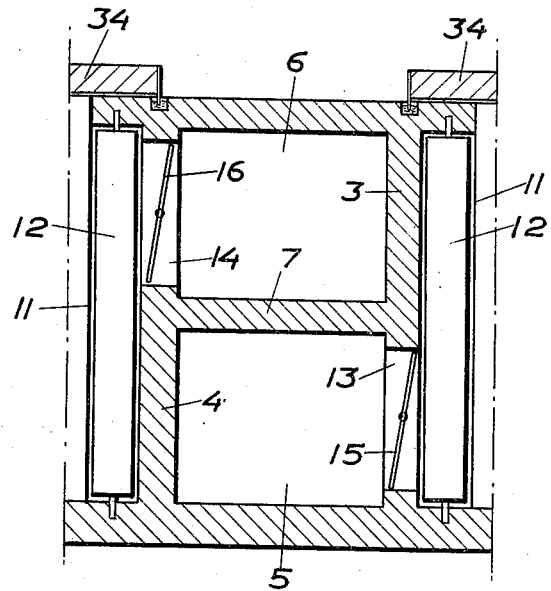
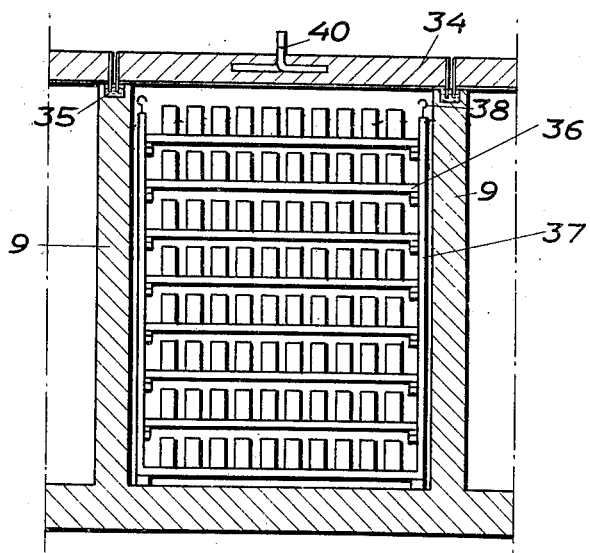
INVENTORS
HARRY DANIEL HALLENBERG
HANNU JYRKI AURAMO
By Arthur H Robert
ATTORNEY Patented Jan. 16, 1951

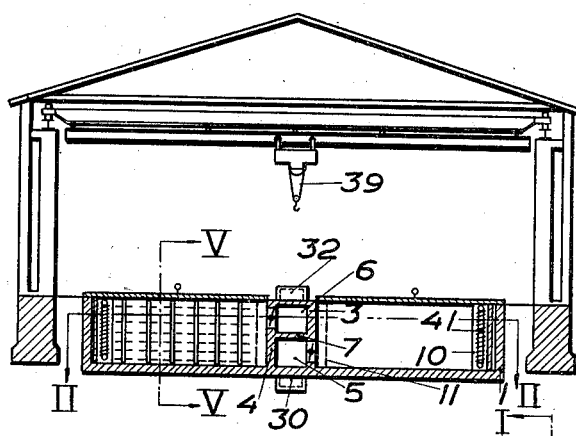
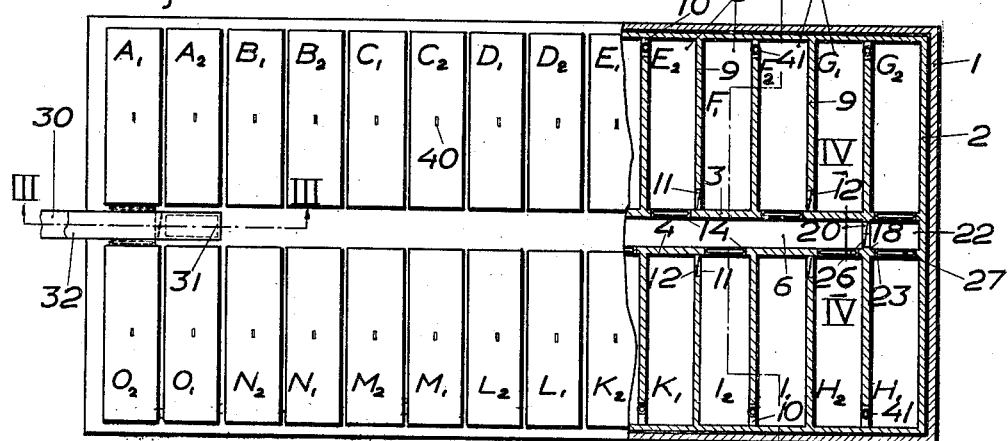
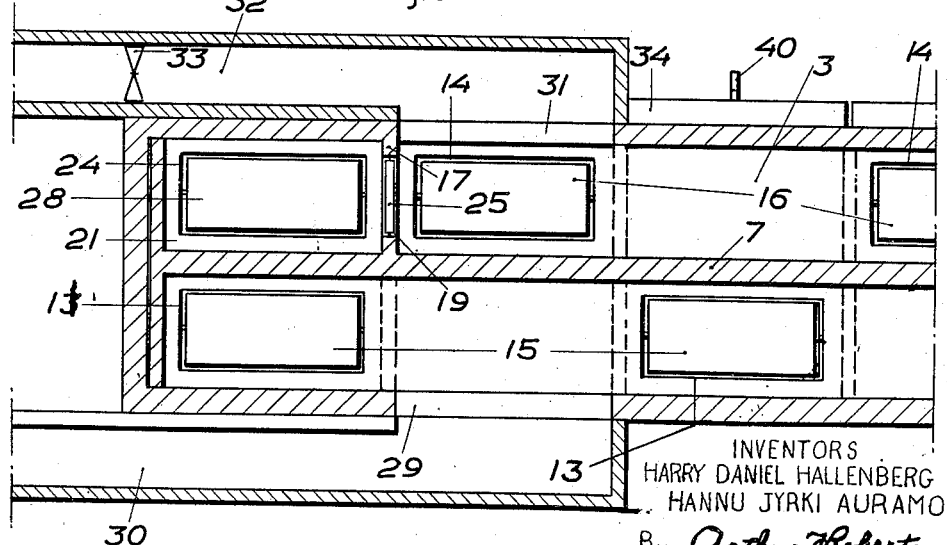

2,538,363

UNITED STATES PATENT OFFICE 2,538,363

DRYING APPARATUS

Harry Daniel Hallenberg and Hannu Jyrki Auramo, Helsingfors, Finland

Application April 1, 1946, Serial No. 658,753

10 Claims. (Cl. 34—217)

The invention relates to drying apparatus and has for its object to provide an apparatus of this type adapted particularly for the drying of moist or wet material such as brick, ceramics and the like before the burning, and further contemplates methods of operating such an apparatus which apparatus is simple in construction and very efficient in operation. Other objects will appear from the following claims and from the description of an embodiment of the apparatus according to the invention illustrated in the accompanying drawings.

Fig. 1 is a sectional elevation of a drying apparatus constructed in accordance with the invention, the section being taken on the broken line I—I, Fig. 2;

Fig. 2 is a plan view of the drying apparatus with parts broken away;

Fig. 3 is a detail on an enlarged scale on the line III—III, Fig. 2;

Fig. 4 is a detail on an enlarged scale on the line IV—IV, Fig. 2;

Fig. 5 is a sectional elevation on the line V—V, Fig. 1;

Fig. 6 is a detail on an enlarged scale of a part of Fig. 5.

The apparatus consists of a housing 1 of suitable dimensions, said housing in the illustrated embodiment being of rectangular form. The walls of the housing are preferably lagged with a layer 2 (Fig. 2) of suitable insulation material. The housing 1 is divided into two main chambers by means of walls 3 and 4, and the space between these walls is utilized as a supply duct 5 for fresh air and as an exhaust duct 6 for moist air, the ducts being separated by a wall 7. Each main chamber is divided into a plurality of subchambers 8 by partitions 9. The partitions are provided with openings 10 and 11 alternately located at the outer wall 1 and the inner walls 3 and 4 respectively thus allowing for a zigzag path for the drying medium during operation. Dampers 12 of any suitable kind are arranged in the openings 11 so that the subchambers 8 can be shut off from the main body of the drying apparatus in pairs. Each pair of subchambers 8 is provided with one lower opening 13 and one upper opening 14 giving admission to the ducts 5 and 6, respectively. Dampers 15 and 16 of any suitable kind are arranged in these openings and it is therefore possible to supply fresh air to and exhaust moist air from any pair of subchambers as desired. In both ends of the duct 6 partitions 17 and 18 are placed in registry with the partitions 9 of the adjacent subchambers 8, so that small compartments 21 and 22 are formed. Openings 19 and 20 are provided in the partitions 17 and 18 and in each opening suitable dampers 25 and 26, respectively, are mounted. Each compartment 21 and 22 is thus provided with an opening 19, 20, respectively, to the exhaust duct 6 and an opening 14 to one of the end subchambers 8. In accordance with this invention, however, each compartment 22, 21 is further provided with an opening 24 and 23, respectively, to the other adjacent end subchambers 8, which openings 23 and 24 are provided with suitable dampers 27 and 28, respectively. All dampers mentioned above, may for instance be of the butterfly type. The adjustment of all dampers is made by externally located devices not shown on the drawings since they may be of any suitable kind.

The supply duct 5 is provided with an inlet opening 29 connected to a duct 30 from a source of heat for instance an air preheater or flue gases from a furnace. The exhaust duct 6 is provided with an outlet 31 connected to a duct 32 and a fan 33 is arranged in this duct 32 to cause a current of drying medium through the drying apparatus.

In the preferred arrangement of the drying apparatus illustrated in the drawings the chambers 8 are open at the top for loading and unloading the material to be treated. When the drying apparatus is operated these openings are closed by means of covers 34, one cover for each subchamber 8. For large drying apparatus two or more covers for each subchamber may be used. The joints between the covers 34 and the walls 1, 3 and 4 of the drying apparatus and the partitions 9 are made air-tight by means of tightening devices, preferably in form of sand-traps 35 as shown in Figure 6.

In order to facilitate the loading and unloading of the drying apparatus the goods to be treated may be piled on special loading devices comprising a number of shelves 36 arranged on a frame-work 37 provided with hooks 38 or the like for connection to a lifting device 39. This lifting device may be of any suitable kind and is also utilized for operating the covers 34 which are provided with hooks 40. The loading devices may either be placed direct on the floor of the drying apparatus or hanged on special supports on the partitions 9.

The drying apparatus may also be equipped with internal heating devices thus allowing for the drying rate to be maintained at a sufficient value and the entropy of the drying medium being raised through the drying apparatus. In the preferred embodiment shown in the drawings, heating coils 41 are placed in the openings 10 of the partitions 9. Each coil 41 may be fed with any suitable heating medium and independently regulated.

An advantage with the drying apparatus according to the invention is the possibility to operate it continuously by aid of only one channel, divided into an inlet and an outlet duct. To this end two of the subchambers, for instance $A_1$ and $A_2$, are shut off by closing their dampers 12, 15, 16 and 28 and all the other subchambers $B_1$, $B_2$, $C_1$, $C_2$, $D_1$, $D_2$, $E_1$, $E_2$, $F_1$, $F_2$, $G_1$, $G_2$, $H_1$, $H_2$, $I_1$, $I_2$, $K_1$, $K_2$, $L_1$, $L_2$, $M_1$, $M_2$, $N_1$, $N_2$, $O_1$, $O_2$ are connected to each other in series by opening their dampers 12, closing all their dampers 15 and 16 with exception of the damper 15 to the subchamber $B_1$, the damper 16 to the subchamber $O_2$ and the damper 16 between subchamber $G_2$ and the compartment 22, the damper 26 closed, the damper 27 opened and the damper 25 opened. With the dampers arranged in this manner and the subchambers loaded with material to be treated the drying medium in the duct 30, after starting the fan 33, passes the opening 29, enters the duct 5 and passes into the subchamber $B_1$, where the goods are nearly dried. From subchamber $B_1$ the drying medium passes the subchambers $B_2$, $C_1$, $C_2$, . . . $G_2$ and enters the compartment 22. From compartment 22 it passes into subchamber $H_1$ and further through the subchambers $H_2$, $I_1$, . . . $O_1$ and into the subchamber $O_2$. From this last mentioned subchamber the drying medium enters the duct 6, passes the opening 31 and escapes through the duct 32.

As soon as the material to be treated in the subchambers $B_1$ and $B_2$ is dried sufficiently and the subchambers $A_1$ and $A_2$ are loaded with fresh material to be treated the damper 15 into the subchamber $C_1$ is opened for fresh air from the duct 5, the subchambers $B_1$ and $B_2$ are shut off by closing their dampers 15, 16, 12, 12, and the subchambers $A_1$ and $A_2$ are connected to the subchambers in series by opening their dampers 28 and 16 and closing the damper 25. The drying medium now enters subchamber $C_1$, passes the subchambers $C_2$, $D_1$ . . . $O_2$, $A_1$, $A_2$ and escapes from subchamber $A_2$ into the duct 6 and further out through the exhaust duct 32. The subchambers $B_1$ and $B_2$ are now ready to be unloaded of dried material and loaded with material to be dried. From the given example above it will be clear that the drying apparatus is allowed to be operated continuously. Instead of operating all the subchambers in the drying apparatus in series it is possible to divide the number of subchambers in 2, 3 or more groups of subchambers in series and operate each group as a unit. In this case the groups are arranged in series and the inlet subchamber for fresh air in one group is separated from the outlet subchamber for moist air in another group of subchambers by a shut off pair of subchambers (for instance $D_1$, $D_2$). The inlet subchamber in each group is thereby in communication with the supply duct and the outlet subchamber in communication with the exhaust duct and all groups operated in parallel. After shutting off the two first subchambers in a group for unloading and reloading them, said two subchambers are connected to the next group as last subchambers in that group and so on. By this arrangement the groups are arranged in succession after each other in the direction of flow of the drying medium.

Instead of regarding the chambers $A_1$ and $A_2$ or $B_1$ and $B_2$ etc. as two subchambers they may even be regarded as one chamber $A_{1,2}$ or $B_{1,2}$ only divided by a partition 9 in two parts. Each such chamber $A_{1,2}$ etc. is then provided with openings 13, 14 and 11 and each opening with a damper 15, 16 and 12, respectively. When the drying apparatus is arranged to be operated in two or more groups each group may have the same number of chambers.

We wish it understood that our invention is not limited to any specific construction, arrangement or form of the parts, as it is capable of numerous modifications and changes without departing from the spirit of the claims.

Having thus described our invention, what we claim as new, and desire to secure by United States Letters Patent, is:

1. A drying apparatus comprising two main chambers providing a channel between said chambers extending substantially the length thereof and separated therefrom by dividing walls, said channel being divided by a longitudinal wall into an inlet and an outlet duct for a drying medium, end partitions providing a compartment at each end of said outlet duct forming a part of the duct, partitions in said main chambers dividing each main chamber into a number of subchambers, means for establishing communication in series between all said subchambers, means for establishing and shutting off communication between said subchambers singly and said inlet and outlet ducts, respectively, means for establishing and shutting off communication between said compartments and the central part of said outlet duct and between each of said compartments and the outermost subchamber in each main chamber at the adjacent end of the apparatus.

2. A drying apparatus comprising two main chambers providing a channel comprising two ducts separated from each other by a dividing wall to form an inlet and an outlet duct for a drying medium, a compartment at each end of said outlet duct forming a part of the channel, partitions in said main chambers dividing each main chamber into a number of subchambers, means for establishing communication in series between all said subchambers in each of said main chambers, means for establishing and shutting off communication between said subchambers singly and said inlet and outlet ducts, respectively, means for establishing and shutting off communication between said compartments and the central part of said outlet duct and between each of said compartments and the outermost subchamber in each main chamber at the adjacent end of the apparatus, means for admitting drying medium into the central part of said inlet duct and means for escaping drying medium from the central part of said outlet duct.

3. A drying apparatus comprising two main chambers providing a channel comprising two ducts separated from each other by a dividing wall to form an inlet and an outlet duct for a drying medium, a compartment at each end of said outlet duct forming a part of the channel, partitions in said main chambers dividing each main chamber into an even number of subchambers, means for establishing communication in series between all said subchambers in each of said main chambers, means for establishing and shutting off communication between said subchambers in pairs and said inlet and outlet ducts, respectively, means for establishing and shutting off communication between said compartments and the central part of said outlet duct and between each of said compartments and the outermost subchamber in each main chamber at the adjacent end of the apparatus, means for admitting drying medium into the central part of said inlet duct and means for escaping drying medium from the central part of said outlet duct.

4. A drying apparatus comprising two main chambers providing a channel comprising two ducts separated from each other by a dividing wall to form an inlet and an outlet duct for a drying medium, a compartment at each end of said outlet forming a part of the channel, partitions in said main chambers dividing each main chamber into a number of subchambers, means for establishing communication in series between all said subchambers in each of said main chambers, means for establishing and shutting off communication between said subchambers singly and said inlet and outlet ducts, respectively, means for establishing and shutting off communication between said compartments and the central part of said outlet duct and between each of said compartments and the outermost subchamber in each main chamber at the adjacent end of the apparatus, means for admitting drying medium into the central part of said inlet duct and means for escaping drying medium from the central part of said outlet duct, a fan in said means for escaping drying medium from the central part of said outlet duct.

5. A drying apparatus comprising two main chambers providing a channel comprising two ducts separated from each other by a dividing wall to form an inlet and an outlet duct for a drying medium, a compartment at each end of said outlet duct forming a part of the channel, partitions in said main chambers dividing each main chamber into an even number of subchambers, means for establishing communication in series between all said subchambers in each of said main chambers, means for establishing and shutting off communication between said subchambers in pairs and said inlet and outlet ducts, respectively, means for establishing and shutting off communication between said compartments and the central part of said outlet duct and between each of said compartments and the outermost subchamber in each main chamber at the adjacent end of the apparatus, means for admitting drying medium into the central part of said inlet duct and means for escaping drying medium from the central part of said outlet duct, a fan in said means for escaping drying medium from the central part of said outlet duct.

6. A drying apparatus comprising two main chambers providing a channel comprising two ducts separated from each other by a dividing wall to form an inlet and an outlet duct for a drying medium, a compartment at each end of said outlet duct forming a part of the channel, partitions in said main chambers dividing each main chamber into an even number of subchambers, means for establishing communication in series between all said subchambers in each of said main chambers, means for establishing and shutting off communication between said subchambers in pairs and said inlet and outlet ducts, respectively, means for establishing and shutting off communication between said compartments and the central part of said outlet duct and between each of said compartments and the outermost subchamber in each main chamber at the adjacent end of the apparatus, internal heating means for said subchambers in pairs to allow the drying rate to be maintained at a sufficient value and the entropy of the drying medium to be raised.

7. A drying apparatus comprising two main chambers, providing a channel between said chambers extending substantially the length thereof and separated therefrom by dividing walls, said channel being divided by a longitudinal wall into an inlet and an outlet duct, end partitions adjacent the ends of said outlet duct providing end compartments, said channel providing a main outlet and a main inlet, a plurality of partitions in said chambers providing end subchambers and intermediate subchambers, said partitions having openings therein to provide communication in series between said subchambers, valves in alternate openings in said partitions, said dividing wall providing inlet openings communicating between said inlet duct and alternate intermediate subchambers, and providing outlet openings communicating between said outlet duct and alternate intermediate subchambers, said dividing walls having openings therein providing communication with the end subchambers and said compartments, and said end partitions having openings connecting said compartments with said outlet duct.

8. A drying apparatus comprising two main chambers, providing a channel between said chambers extending substantially the length thereof and separated therefrom by dividing walls, said channel being divided by a longitudinal horizontal wall into an inlet and an outlet duct, end partitions adjacent the ends of said inlet duct providing end compartments, said outlet duct providing a main outlet, and said inlet duct providing a main inlet, a plurality of vertical partitions in said chambers providing end subchambers and intermediate subchambers, said latter partitions having staggered openings therein to provide communication in series between said subchambers, valves in alternate openings in said partitions, said dividing wall providing inlet openings between said inlet duct and alternate subchambers, and providing outlet openings between said outlet duct and alternate subchambers, said dividing walls having openings therein providing communication with the end subchamber and end compartments, and said end partitions having openings connecting said compartments with said outlet duct, and valves in said openings in the dividing walls and end partitions.

9. A drying apparatus comprising: two main chambers separated by dividing walls providing a channel therebetween and extending substantially the length of said chambers, said channel being divided by a longitudinal wall into an inlet and an outlet duct for a drying medium, partitions in said main chamber dividing each main chamber into an even number of subchambers, means for establishing communication in series between all said subchambers in each of said main chambers, means for establishing and shutting off communication between said subchambers in pairs and said inlet and outlet ducts, respectively, partitions providing a compartment at each end of said outlet duct, means for establishing and shutting off communication between said respective compartments and the outlet duct, and means for establishing and shutting off communication between the endmost subchamber in each main chamber and the respective compartments.

10. A drying apparatus comprising: two main chambers providing walls, one at each side of a channel, said channel being divided into a supply duct for drying medium and an exhaust duct for moist medium, partitions in said main chambers dividing them into an even number of subchambers, each partition having an opening communicating the subchambers in each of said main chambers with one another, said openings being alternately located adjacent a wall of said channel and adjacent an outer wall of said main chamber, a damper in each of said openings located adjacent a wall of the channel, said channel walls having openings between alternate subchambers and said supply and exhaust ducts, respectively, said latter openings in the walls of the channel being vertically displaced from each other so that of two opposed subchambers located on opposite sides of the channel only one is provided with an opening into the supply duct and the other only with an opening into the exhaust duct, two dividing walls in said exhaust duct providing a compartment at each end of the exhaust duct, each of said dividing walls having an opening therein and a damper in each opening, each of the walls between said compartments and the adjacent endmost subchambers having an opening, and a damper in each of said last mentioned openings.

HARRY DANIEL HALLENBERG.
HANNU JYRKI AURAMO.

REFERENCES CITED

The following references are of record in the file of this patent:

UNITED STATES PATENTS

| Number | Name | Date |
|---|---|---|
| 1,060,425 | Buhrer | Apr. 29, 1913 |
| 1,592,946 | Knight | July 20, 1926 |
| 1,685,047 | Fuller | Sept. 18, 1928 |
| 1,718,845 | Younger | June 25, 1929 |

FOREIGN PATENTS

| Number | Country | Date |
|---|---|---|
| 15,108 | Great Britain | 1903 |